United States Patent Office 2,889,317
Patented June 2, 1959

2,889,317
BIGUANIDE AZO DYES

Robert S. Long, Bound Brook, and Sien Moo Tsang, Middlesex, N.J., assignors to American Cyanamid Company, New York, N.Y., a corporation of Maine No Drawing. Application November 21, 1957
Serial No. 697,766

7 Claims. (Cl. 260—160)

The present invention refers to a new series of dyestuffs of the formula:

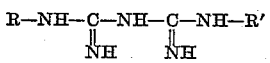

in which R and R' represent radicals of azo dyes, which radicals are not necessarily identical. These new dyestuffs, which lend themselves to excellent all-round application, possess good fastness characteristics and cover a wide range of attractive shades.

These products can be prepared via the reaction of dicyanamide with aromatic amines, as follows:

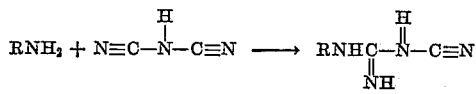

The intermediate substituted cyanoguanidine can then be reacted with a second mol of the same or a different amine, as follows:

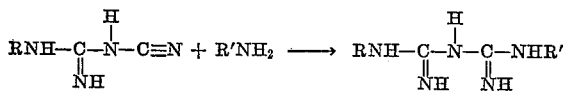

It has been discovered that these reactions succeed not only with simple amines, such as m-aminophenol, but also proceed smoothly with aminosulfonic acids such as J-acid and with certain azo dyes containing free amino groups. Furthermore, the products thus obtained are capable of diazotization and coupling reactions, depending upon the substituents present, and thus can give rise to a great variety of novel azo dyes, characterized by the presence of the biguanide linkage,

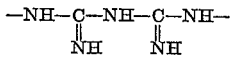

as a bridge between similar or dissimilar moieties of the molecule. This linkage is very stable and is not affected by the ordinary procedures of preparing and applying azo dyes. For example, if hydroxyl groups are present in positions ortho to the azo linkages, the dyes may be converted by ordinary methods to metallic complexes either on the fiber or in bulk. On the other hand, the use of proper hydrolytic conditions may lead to the corresponding guanylureas or biurets,

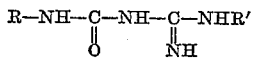

and

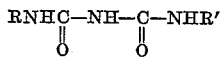

The varied components which can be incorporated into the novel dyes of the present invention give rise to a wide variety of shades and other properties, which can be altered according to the purpose in view. Thus, it is possible to obtain either azo pigments, which may also be of use for the dyeing of acetate or other synthetic fibers, or water-soluble azo dyes, which may be useful for the dyeing of wool, silk, cotton, nylon, etc. Because the biguanide nucleus is basic in character, even the unsulfonated azo pigments may be applied as basic dyes.

Dyes falling under the scope of this invention may also be prepared using biguanides which contain diazotizable amino groups. Such compounds, when diazotized and coupled with any of the available coupling components commonly used for azo dyes and pigments, will give rise to products containing the desired biguanide bridge. For example, reaction of para-aminoacetanilide with dicyanamide followed by hydrolysis of the acetyl groups gives 1,5-bis (4-aminophenyl) biguanide which can be readily tetrazotized and used for the preparation of dyes and pigments just as similar compounds such as benzidine and dianisidine have been used in the past. Again, it is very simple to prepare unsymmetrical dyes and pigments by carrying out the condensation with dicyanamide in a step-wise fashion using two different amines or by coupling the tetrazo compound with two different coupling components.

The coupling components which can be used include all known coupling components such as those described in "The Chemistry of Synthetic Dyes" by Venkataraman, Academic Press, New York, 1952, in the various chapters on azo dyes, such as chapters 3–6 inclusive and 8–22 inclusive.

It is an advantage that the preparation of biguanide derivatives of this type is a simple operation that can be readily carried out on a large scale. It is only necessary to heat a solution of sodium dicyanamide in water with the amine hydrochloride. Generally, it is convenient to use the sodium salt of dicyanamide, and heating this material under reflux in water with the amine at a pH of about 4.5 gives a smooth conversion to the biguanide. If an unsymmetrical biguanide is desired, only one mol of the amine is added. When reaction is complete, as indicated by the absence of a test for a free amino group, a mol of the second amine is added and refluxing is continued until formation of the unsymmetrical biguanide is complete.

When the aminoaryl biguanide has a metallizable group ortho to the diazotizable amino group, the biguanide can be coupled into coupling components likewise having a metallizable group ortho to the point of coupling to formed metallized dyes. Some of these are especially useful as direct dyes for cotton. Among such coupling components are beta-naphthol and its sulfonated derivatives such as 2-naphthol-6-sulfonic acid, 2-naphthol-8-sulfonic acid, R-acid, G-acid, and other polysulfonic acids such as 2-naphthol-3,7-disulfonic acid and 2-naphthol-3,6,8-trisulfonic acid, delta acid, chromotropic acid, gamma acid, and the like; pyrazolones such as 4'-sulfo-1-phenyl-3-methyl-5-pyrazolone; and other coupling components such as acetoacetanilide, benzoylacetonitrile, and the like.

The metals usually used to form metallized dyes are those of atomic numbers 24–30, namely chromium, manganese, iron, cobalt, nickel, copper, and zinc. These are usually used in the form of their salts. Other polyvalent metals such as those of the various transition series in the periodic table (atomic numbers 42–47, 58–71, and 74–80) as well as aluminum, lead, zirconium and the like similarly can be used.

These methods of preparation, all based on dicyanamide, are considered the most desirable, but the invention is not limited in any way by preparative methods. A number of methods are known for the preparation of N-aryl-cyanoguanidines, the intermediates obtained in the above syntheses. For example, cyanogen chloride may be reacted with guanidine, or a derivative of guanidine; however, cyanogen chloride is toxic and difficult to handle, and preparation of a suitable guanidine by this method involves additional problems.

This application is a continuation-in-part of our now abandoned copending application, Serial No. 462,373, filed October 14, 1954, which is a division of our now abandoned copending application, Serial No. 358,574, filed May 29, 1953.

The present invention is further described in the following examples. Parts are by weight, unless otherwise specified.

*Example 1*

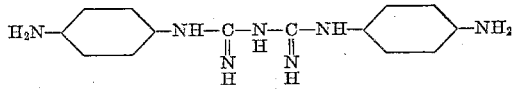

A mixture of 62.5 parts (pure basis) of p-amino-acet-anilide, 17.8 parts of sodium dicyanamide and 200 parts of water is heated rapidly to 90° C., followed by the gradual addition of 92 parts of 5 N hydrochloric acid. The mixture is then heated at 95° C. for several hours, the pH being approximately 4. The resulting hot solution is clarified by filtration and is allowed to cool. The diacetyl derivative separates from the solution and is filtered. The final product is obtained by hydrolysis of the diacetyl compound in 5 N hydrochloric acid at room temperature.

*Example 2*

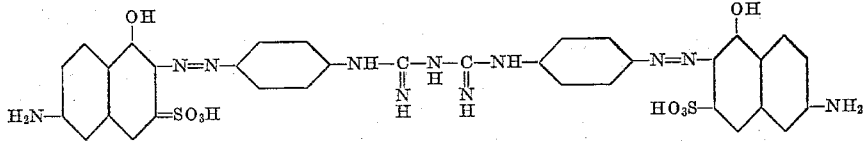

The tetrazo is prepared in the ordinary way from 1.63 parts (pure basis) of bis-(p-aminophenyl)biguanide of the preceding example with dilute hydrochloric acid and sodium nitrite solution at 15° C. This is added to a solution of 6.05 parts (pure basis) of J-acid in dilute aqueous sodium carbonate. The mixture is stirred overnight. The dye is filtered and dried. It dyes cotton cloth a red shade.

*Example 3*

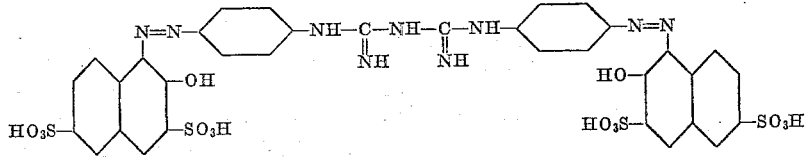

The tetrazo prepared from bis-(p-aminophenyl)biguanide as in Example 3 is coupled with R-salt by the procedure of Example 3. The product is a red direct dye for cotton.

*Example 4*

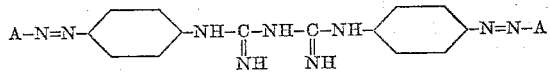

The tetrazo prepared from a solution of 1.63 g. of bis-(p-aminophenyl)biguanide as in Example 3 is neutralized to the Congo Red endpoint with sodium acetate and diluted to 1000 cc.

To portions of this solution are added pieces of cloth on which have been printed stripes of the various coupling components indicated below. Color development is rapid. After soaping, the following shades are obtained:

| A= | Shade |
|---|---|
| Naphthol: | |
| AS | Bluish-red. |
| AS-D | Do. |
| AS-OL | Maroon. |
| AS-PN | Bluish-red. |
| AS-RL | Plum. |
| AS-TR | Maroon. |
| AS-BS | Violet. |
| AS-GR | Gray. |
| AS-BO | Maroon. |
| AS-BR | Violet brown. |
| AS-SW | Maroon. |
| AS-G | Reddish-yellow. |
| AS-DB | Tan. |
| AS-LB | Brown. |
| Beta-naphthol | Reddish-orange. |
| 1-phenyl-3-methylpyrazolone | Orange. |
| Benzoylacetonitrile | Do. |
| Acetoacetanilide | Yellow. |

We claim:
1. Azo dyes formed by coupling a diazonium salt from compounds having the formula:

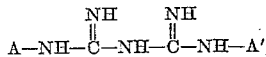

in which A and A' are aromatic carbocyclic radicals of less than three six-membered rings, at least one of A and A' being substituted in a position para to the NH when A is monocyclic and in the 6-position when A is naphthylene by an amino group, with a coupling component.

2. Azo dyes of claim 1 in which there is a metallizable group on a carbon adjacent to said amino group.

3. Azo dyes of claim 1 in which the coupling component is sulfonated.

4. A compound having the formula:

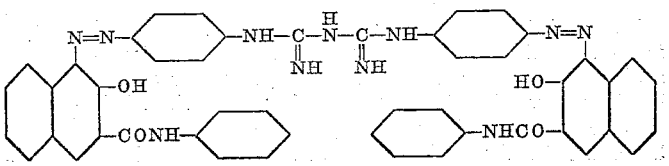

5. A compound having the formula:
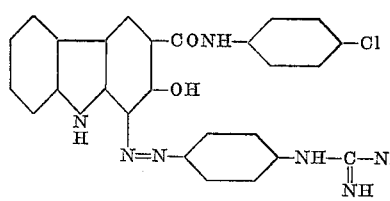
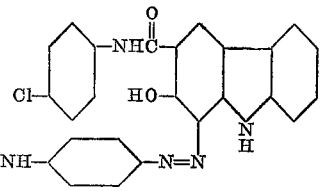
6. A compound having the formula:
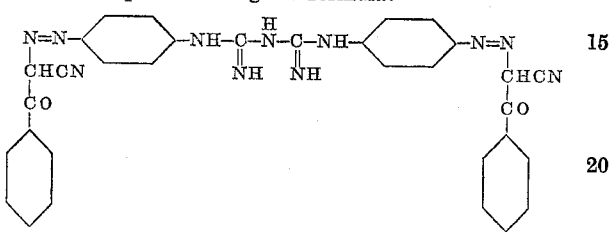
7. A compound having the formula:
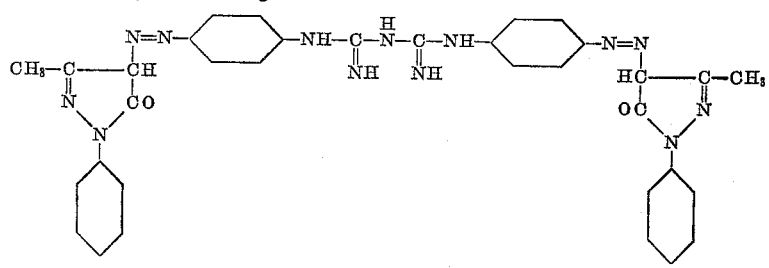
No references cited.